(12) United States Patent
Ewald

(10) Patent No.: US 11,801,561 B2
(45) Date of Patent: Oct. 31, 2023

(54) TOOL TURRET

(71) Applicant: SAUTER FEINMECHANIK GMBH, Metzingen (DE)

(72) Inventor: Marius Ewald, Metzingen (DE)

(73) Assignee: KOLIBRI BETEILIGUNGSGESELLSCHAFT MBH & CO. KGAA, Kleinmachnow (DE)

( * ) Notice: Subject to any disclaimer, the term of this patent is extended or adjusted under 35 U.S.C. 154(b) by 403 days.

(21) Appl. No.: 17/058,734

(22) PCT Filed: Jun. 4, 2019

(86) PCT No.: PCT/EP2019/064462
§ 371 (c)(1),
(2) Date: Nov. 25, 2020

(87) PCT Pub. No.: WO2019/238468
PCT Pub. Date: Dec. 19, 2019

(65) Prior Publication Data
US 2021/0213577 A1    Jul. 15, 2021

(30) Foreign Application Priority Data

Jun. 12, 2018   (DE) ..................... 10 2018 004 677.0

(51) Int. Cl.
*B23B 29/34* (2006.01)
*B23Q 5/10* (2006.01)
(Continued)

(52) U.S. Cl.
CPC ............ *B23B 29/34* (2013.01); *B23B 31/265* (2013.01); *B23Q 5/10* (2013.01);
(Continued)

(58) Field of Classification Search
CPC ............... Y10T 29/5155; Y10T 29/519; Y10T 82/2587; Y10T 408/37; Y10T 483/1719;
(Continued)

(56) References Cited

U.S. PATENT DOCUMENTS 4,414,724 A * 11/1983 Garnett .............. B23Q 3/15506
82/160
4,641,413 A * 2/1987 Hallqvist ............... B23Q 7/046
82/125

(Continued)

FOREIGN PATENT DOCUMENTS

DE            101 21 694        11/2002
DE       10 2005 033 890         1/2007
(Continued)

OTHER PUBLICATIONS

International Search Report (ISR) dated Aug. 9, 2019 in International (PCT) Application No. PCT/EP2019/064462.

*Primary Examiner* — Erica E Cadugan
*Assistant Examiner* — Michael Vitale
(74) *Attorney, Agent, or Firm* — WENDEROTH, LIND & PONACK, L.L.P.

(57) ABSTRACT

A tool turret, in particular provided for the use for a machine tool, has a pivotable tool disk (10), which has on its outer circumference a plurality of receptacles (14) for holders (18) provided with working tools. The holders (18) are attached to the tool disk (10) in a changeable manner by a fixing device (20). Each holder (18) can be swiveled into a working position to permit the assigned working tool to be driven by a drive (22). For this purpose, the working tool can be coupled to an output shaft (16) of the respective holder (18) by a coupling device (26). The fixing device (20) can be actuated by the drive (22) when this drive (22) is uncoupled while stopping the working tool.

10 Claims, 5 Drawing Sheets

(51) Int. Cl.
 *B23B 31/26* (2006.01)
 *B23Q 3/157* (2006.01)
 *B23Q 3/155* (2006.01)

(52) U.S. Cl.
 CPC .............. *B23Q 2003/15586* (2013.01); *B23Q 2220/002* (2013.01); *Y10T 29/519* (2015.01); *Y10T 29/5155* (2015.01); *Y10T 408/37* (2015.01); *Y10T 483/1719* (2015.01)

(58) Field of Classification Search
 CPC . Y10T 483/1721; B23B 29/24; B23B 29/242; B23B 29/246; B23B 29/34; B23B 39/20; B23B 39/205; B23B 31/265; B23Q 2003/15586; B23Q 2220/002; Y10S 279/90; Y10S 279/901
 USPC ............ 29/33 J, 40; 82/159; 408/35; 483/24, 483/25
 See application file for complete search history.

(56) References Cited

U.S. PATENT DOCUMENTS

| | | | | |
|---|---|---|---|---|
| 5,745,967 | A * | 5/1998 | Kojima ................ | B23Q 16/102 475/903 |
| 7,475,463 | B1 * | 1/2009 | Chang ..................... | B23Q 5/04 29/48.5 R |
| 2008/0203682 | A1 * | 8/2008 | Neumeier ................ | B23Q 1/70 279/143 |
| 2010/0029451 | A1 * | 2/2010 | Sahm ....................... | B23Q 5/04 29/40 |
| 2012/0168190 | A1 * | 7/2012 | Linder ..................... | B23Q 5/04 173/50 |
| 2013/0157825 | A1 | 6/2013 | Beck et al. | |
| 2017/0014965 | A1 * | 1/2017 | Baldaccini .......... | B23B 31/2072 |
| 2018/0117681 | A1 * | 5/2018 | Aoyagi ..................... | B23Q 5/10 |
| 2019/0224795 | A1 * | 7/2019 | Giesler .................... | B23Q 3/12 |

FOREIGN PATENT DOCUMENTS

| | | | |
|---|---|---|---|
| DE | 10 2010 021 949 | 12/2011 | |
| DE | 10 2010 044 968 | 3/2012 | |
| DE | 10 2012 104 490 | 11/2013 | |
| DE | 10 2014 003 336 | 9/2015 | |
| DE | 102015003892 A1 * | 9/2016 | ............... B23Q 1/70 |
| DE | 10 2016 001 804 | 8/2017 | |
| DE | 102016010700 A1 * | 3/2018 | ............. B23B 29/32 |
| DE | 10 2017 007 648 | 2/2019 | |
| DE | 102018003941 A1 * | 11/2019 | ............. B23Q 5/045 |
| DE | 102019003392 A1 * | 11/2020 | ........... B23Q 11/103 |
| EP | 3072634 A2 * | 9/2016 | ............... B23Q 1/70 |

* cited by examiner

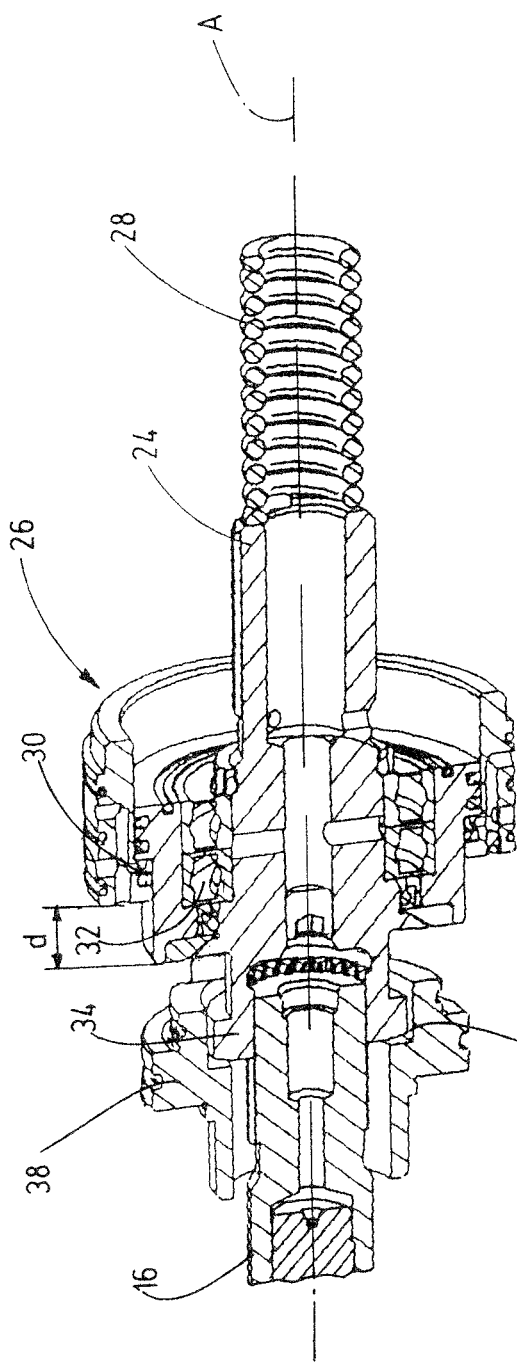
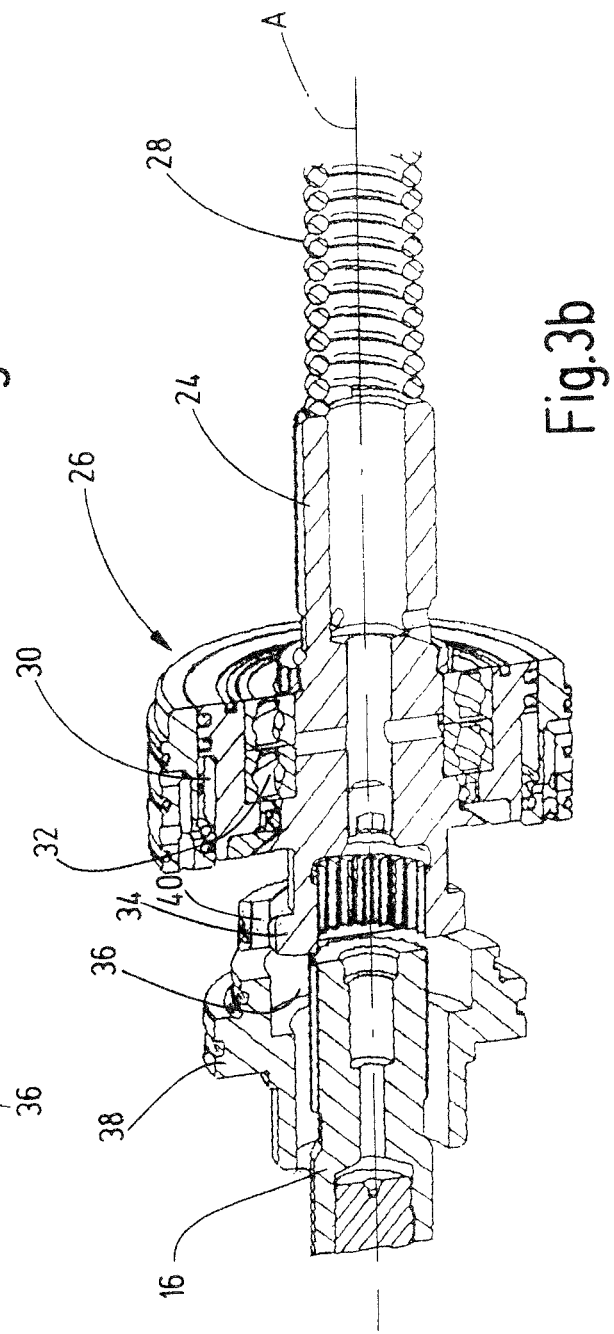

TOOL TURRET

FIELD OF THE INVENTION

The invention relates to a tool turret, in particular provided for the use for a machine tool, having a pivotable tool disk, which has on its outer circumference a plurality of receptacles for holders provided with working tools. The holders are attached to the tool disk in a changeable manner by a fixing device, and each is swiveled into a working position to permit the assigned working tool to be driven by a drive, which for this purpose can be coupled to an output shaft of the respective holder by a coupling device.

BACKGROUND OF THE INVENTION

Such tool turrets are known from DE 10 2005 033 890 A1 or DE 10 2014 003 336 A1, for instance. The working tools to be used are mainly tools for cutting, such as drilling, turning or milling tools. To adapt to respective different working tasks, change operations have to be performed, in which a tool holder, located in a particular working position, for working tools of one type is changed and replaced by a tool holder for working tools of different type. In certain manufacturing tasks, such as small series production, the different tool holders being used have to be changed frequently. This results in a considerable amount of work for the operating personnel, and thus, in an increase in working costs.

SUMMARY OF THE INVENTION

In view of this problem, the invention addresses the problem of permitting the change of tool holders on a tool turret in a particularly rational, cost-effective and reliable manner.

According to the invention, this problem is basically solved by a tool turret, which has a fixing device actuatable by the drive when this drive is uncoupled while stopping the working tool. The drive, which in the regular operation of the tool turret serves to drive a working tool and is mounted in the assigned holder, is in accordance with the invention also used for changing the tool holder and the drive of the fixing device required for this purpose. A separate drive for the fixing device is therefore dispensable. The fixing device is the central component for changing the tool holder and is, in accordance with the invention, actuated by the tool direct drive.

The tool holder change can be performed using just a few steps, uncoupling the drive to stop the working tool and driving the fixing device to release the one tool holder and secure the other tool holder. An exchange of the one tool holder for working tools of one type for the other tool holder for working tools of another type can then be performed particularly rational and cost-effective.

The fixing device, integrated into the tool turret formed in accordance with the invention, permits an automatic tool holder change and thus a smooth operation of a turning machine center at simultaneously high flexibility regarding the width of the manufacturing spectrum. The sequence of the changing process up to the release of the tool holder to be changed is preferably machine-controlled. Removing the tool holder to be changed and inserting the new tool holder by a handling robot, a fully automatic tool change, and thus, an at least semi-automated operation of the entire system can be achieved. The automatic tool holder change reduces the set-up costs and results in a corresponding reduction of working hours and labor costs when operating the tool turret according to the invention.

In a preferred embodiment of the tool turret according to the invention, the fixing device can be actuated by the drive in the working position and/or in a change position, which is different from the working position at the tool disk, preferably on the opposite side of the working position. A tool holder change in the working position has the advantage of good accessibility for removing the tool holder to be changed and for inserting the new tool holder, because for this purpose the assigned working area for workpieces can be jointly used. A changing position, different from the working position, permits the removal of one tool holder and the insertion of the other tool holder, undisturbed by workpiece holders or the like. Preferably a handling system, such as a robot, is provided for this purpose. A change position, opposite from the working position, has the advantage that the drive axis of the tool drive is aligned in parallel, preferably coaxial, to the drive axis of the fixing device in the change position and is directly useable for driving the securing device. In this way, changing operations for holders with and without working tools can be performed in an easily accessible manner away from the working position.

Further, it is advantageous if the fixing device has a pawl gear having control pawls and latching pawls pairwise assigned to each other, which can be controlled by an actuating device and/or, in their locked position, connect a holder to the tool disk and, in their detached position, release this holder. The control pawls and latching pawls permit a secure and quick tool holder change in one actuation step by corresponding latching with the holder or releasing it. Furthermore, high holding forces can be achieved on the respective holder in the context of processing.

In a preferred embodiment of the tool turret according to the invention, a rotary motion of the actuating device by the drive is used to convert this rotary motion into a translatory motion for the control pawls. This translatory motion causes the latching pawls in one direction to drop in their released position in a receptacle space of the control pawls and in the opposite direction causes the displacement of the latching pawls from the receptacle space in the direction of their latched position. This arrangement results in the advantage of a latch gear together with the assigned actuating device can be implemented in a compact construction.

In a further preferred embodiment of the tool turret according to the invention, while bringing the latching pawls into their released position, the control pawls are moved in the direction of the holder and lift it from its seat at the tool disk with a pre-settable release force. In particular, the forces, generated by the pawl arrangement, are selected such that the lowest possible release force is required to lift the holder from the tool disk. In this way, small actuating forces suffice to change a tool holder at the tool turret according to the invention.

In a further preferred embodiment of the tool turret according to the invention, the latching pawls are each supported pivotably about a swivel axis, and the control pawls are an integral component of a control sleeve. The control sleeve is movably guided along a receptacle sleeve, which encompasses at least a part of the output shaft of the respective working tool. The receptacle sleeve effectively avoids any obstructions between the at least partially encompassed output shaft for the working tool and the pawl gear, actuated via the control sleeve, for the fixing device during operation and achieves a uniformly introduced actuating force for the latching pawls.

It is also advantageous that the actuating device in the direction of its one free end engages with the control sleeve via a threaded section and in the direction of its other free end has a catch for the action of an entrainer of an input shaft of the drive. In this particular embodiment, the rotary motion of the input shaft is in a simple manner converted into a translatory motion of the control pawl as the actuating device. Depending on the direction of rotation of the input shaft, the control sleeve is moved in one direction or in the other direction. The actuating speed for the fixing device can be predefined by the rotational speed of the drive.

In a preferred embodiment of the tool turret according to the invention, the input shaft of the drive is guided axially displaceable in the tool disk for driving the working tool by the coupling device and for actuating the fixing device in the working position. In the foremost coupling position of the input shaft of the drive, while the entrainer is reaching through the catch, the working tool of the holder is drivable, when the fixing device is inactive. In contrast in a retracted position of the input shaft of the drive, when this drive is interrupted, the entrainer arranged on the input shaft gets into contact with the catch of the actuating device while activating the fixing device. The axial displaceability permits the drive to be used for changing the tool holder when the working tool is at a standstill. A trouble-free operation is before and after a tool holder change without actuating the fixing device.

In another preferred embodiment of the tool turret according to the invention for actuating the fixing device in the change position, the entrainer is located at that end of the input shaft that is opposite from the coupling device. This arrangement results in the advantage of an entrainer, that is always ready for a toolholder change, in the assigned change position.

Preferably, the holder is a spindle head and has a tool spindle that can be driven by the input shaft. The tool holder is particularly preferably formed as a spindle head according to DE 101 21 694 A1. Other types of working tools and output shafts can also be mounted in the holder or arranged thereon. Furthermore, at least one tool holder can also be provided for working tools that do not require a drive. In this case, the drive is only used to actuate the fixing device when changing the tool holder.

The above-mentioned features and the further mentioned features can be implemented according to the invention each individually or in any combination at a tool turret according to the invention.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure and that are schematic and not to scale:

FIGS. 3a and 3b are perspective views, partially in longitudinal section and partially in view, of a coupling device for a tool turret as shown in FIGS. 1 and 2 in different coupling states.

DETAILED DESCRIPTION OF THE INVENTION

Figure 1:
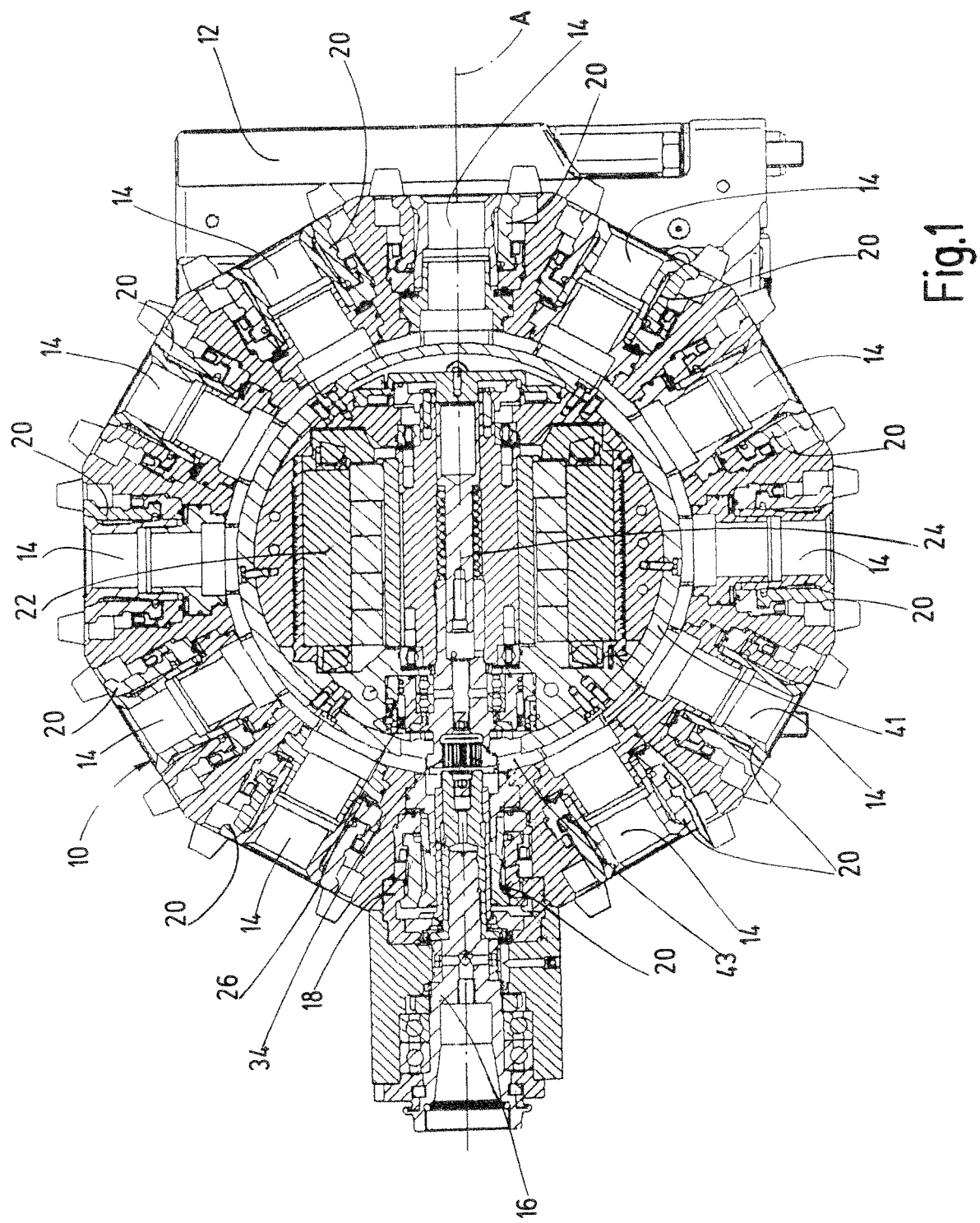
FIG. 1 is a longitudinal view in section of a tool turret according to a first exemplary embodiment of the invention, having a holder arranged in a working position on the tool disk.

FIG. 1 shows a tool disk 10 of a first exemplary tool turret according to the invention. The tool turret is provided in particular for use with a machine tool and is connectable via a base body 12. The tool disk 10 is arranged pivotable in relation to a turret axis on the base body 12 and has a large number of receptacles 14 on the outer circumference, twelve receptacles in the embodiment shown. In FIG. 1 a tool spindle 16 is part of a holder 18, which is formed as a spindle head. The holder 18 has the usual structure of a spindle head as disclosed in DE 101 21 694 A1, for instance, and is shown in the figures without a working tool received therein. The holder 18, mounted in a receptacle 14, is arranged in the working position of the tool disk 10, in relation to the orientation of the drawing sheet of FIG. 1 in the 9 o'clock position. A fixing device of fixer 20 is assigned to every receptacle 14 to fix the respective holder 18 in a changeable manner at the tool disk 10.

The tool turret has a drive 22, integrated into the tool disk 10, in the form of an electric motor that drives a multi-part input shaft 24. The input shaft 24 provides not only the tool drive for the rotating working tool, but also the drive for loosening and fixing of the tool holders 18 by the respective fixing device 20 when the tool holder is changed. For this purpose, the electric motor 22 can be controlled in terms of speed, direction of rotation and angular velocity. By a coupling device or coupler 26, the details of which can be more clearly seen in FIGS. 3a and 3b, the input shaft 24 is axially displaceable between a disengaged position and an engaged position, and in this way connectable to an output shaft, in this case the tool spindle 16, of the respective holder 18 that has been swiveled into the working position. When the drive 22 is disengaged while the working tool is stopped, by the drive 22 the fixing device 20 of the holder 18 in the working position is actuatable and via an entrainer 34 the input shaft 24 is coupled to an actuating device or actuator 38 (FIGS. 3a and 3b) of the fixing device 20.

The input shaft 24 of the drive 22 and the output shaft 16 of the working tool are supported rotatably about a drive axis A. The drive axis A vertically intersects the turret axis of the pivotable tool disk 10. The coupling device 26 is formed and arranged coaxially to the drive axis A. In the embodiment shown in FIGS. 1 and 2, the holder 18 is a spindle head and is used to receive working tools, not shown in detail, in the tool spindle 16, which is set into a circumferential rotary motion by the input shaft 24.

Figure 2:
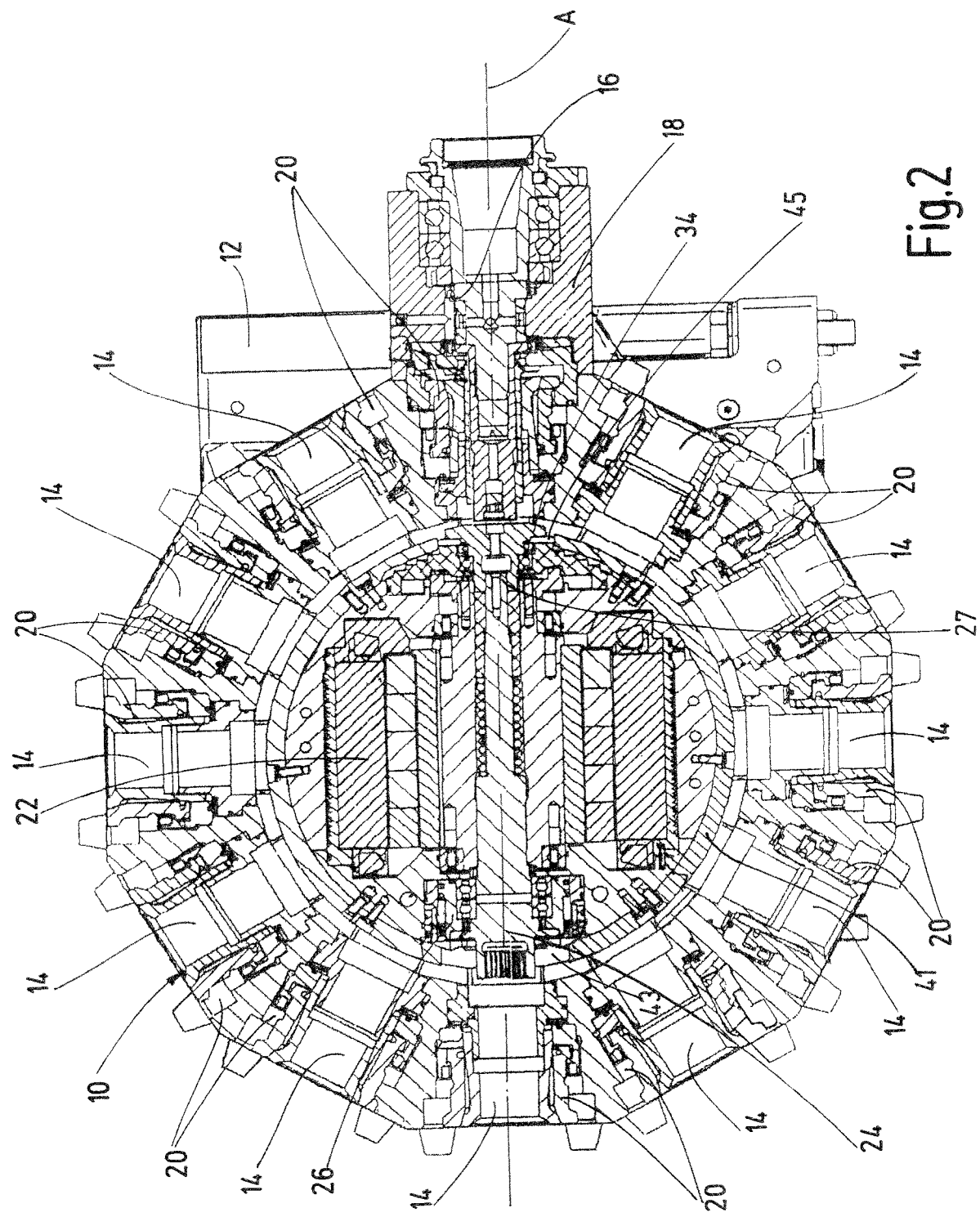
FIG. 2 is a longitudinal view in section of a tool turret according to a second exemplary embodiment of the invention, having a holder arranged in a changing position on the tool disk.

The illustration in FIG. 2 mostly matches the illustration in FIG. 1 and differs from the FIG. 1 illustration in that the holder 18 having the tool spindle 16 of FIG. 2 is swiveled into a change position. The change position is different from the working position and in the embodiment shown is located on the opposite side from the working position on the tool disk 10, in relation to the orientation of the drawing sheet of FIG. 2 in the 3 o'clock position. The drive 22 can be used to actuate the assigned fixing device 20 also in the change position. The input shaft 24, which is arranged rotatably to the drive axis A, can be coupled with an actuating device 38 (FIGS. 3a and 3b). The main difference between the tool turret shown in FIG. 1 and the tool turret shown in FIG. 2 is the arrangement of the entrainer 34 on the input shaft 24. For a tool holder change in the working position according to FIG. 1, the entrainer 34 is located on the side, assigned to the coupling device 26, of the input shaft 24. For a tool holder change in a changing position, that is circumferentially offset by 180° in relation to the working position, the entrainer 34 is located on the side 27, opposite from the coupling device 26, of the input shaft 24.

FIGS. 3a and 3b each show the coupling device 26, partly in longitudinal section, partly in view. To drive a working tool, not shown in more detail in the figures, the input shaft 24 of the drive 22 (FIGS. 1 and 2) is guided axially displaceable along the drive axis A in the tool disk 10 (FIGS. 1 and 2) and is preloaded by a compression spring 28 for motion into the coupled position shown in FIG. 3a. The coupling device 26 is formed as a sliding coupling and has for hydraulic actuation a pressure chamber 30, which, when pressurized by the hydraulic system of the tool turret, moves the input shaft 24 together with its bearing unit 32 in the figures to the right into the disengaged position, shown in FIG. 3b, against the force of the compression spring 28. In the foremost coupling position of the input shaft 24 shown in FIG. 3a, the input shaft together with the bearing unit 32 is pushed out by a distance d relative to a stationary part of the sliding coupling 26, and the sliding coupling front end is in coupling engagement with the tool spindle 16. At the front end, assigned to the tool spindle 16, the input shaft 24 also has an entrainer 34 in the form of a dihedron. In the position of the input shaft 24 engaged to the tool drive, the entrainer 34 rotates freely in an annular space 36, which is at least partially enclosed by an actuating device 38 for the fixing device 20. Because of the free rotation in the annular space 36, the entrainer 34 runs along idle when the tool spindle 16 is driven by the input shaft 24. The actuating device 38 is arranged coaxially to the drive axis A and encompasses each the tool spindle 16 and the input shaft 24 at least partially in the coupled state.

In the rear coupling position shown in FIG. 3b, the working tool is stopped because, as a result of the pressure chamber 30 being pressurized, the input shaft 24 together with bearing unit 32 is pushed into the coupling device 26 by the distance d and the input shaft 24 is out of engagement with the tool spindle 16 in this position. In the position of the input shaft 24 uncoupled from the tool drive, the entrainer 34 is moved out of the annular space 36 and for driving the fixing device 20 is coupled in form-fit engagement to a catch 40 (FIG. 4a, b) as part of the assigned actuating device 38. In the position of the input shaft 24 shown in FIG. 3b, if the drive of the tool spindle 16 is interrupted, the entrainer 34, arranged on the input shaft 24, activates the fixing device 20 (FIGS. 1 and 2) via the catch 40 on the actuating device 38.

FIGS. 3a and 3b illustrate the functional principle of the coupling device 26 and the different coupling states of the input shaft 24, which can be coupled both to the output shaft 16 and to the actuating device 38 for the fixing device 20 (FIGS. 1 and 2). The actuating device 38 at least partially encompasses the output shaft 16 in the axial direction and has, at its end assigned to the input shaft 24, the catch 40. The catch 40 is formed as an engagement slot for the entrainer 34 in an entrainment sleeve 23 (see FIG. 4a, b) of the actuating device 38. During a rotary motion of the tool disk 10, the actuating device 38 is guided along a guide rail 41 (FIGS. 1, 2, 4a and 4b) as the front tool-sided coupling part. The guide rail extends on the outer circumference of the base body 12 of the tool turret concentrically to the turret axis. The guide rail 41, for instance, has the shape of a rib having a rectangular cross-section and is interrupted at the working position by a gap 43. As soon as the input shaft 24 is out of engagement with both the input shaft 16 and the actuating device 38, the tool holders 18 inserted in the individual receptacles 14 can be swiveled along the tool disk 10. The guide rail 41 each reaches through a passage (not shown in the figures) at the pot-shaped drive-sided end of the actuating device 38. The tool spindle 16 and the actuating device 38 are then secured against rotation in the tool holder track outside of the gaps 43 and 45 (FIG. 2).

When changing the tool holder in the change position as shown in FIG. 2, the entrainer 34 in the form of a dihedron is arranged on the opposite side 27 of the input shaft 24. In the uncoupled position of the input shaft 24 shown in FIG. 3b, the assigned end 27 of the input shaft 24 is in coupling engagement with the rotatably supported entrainer 34 in the form of a dihedron, from which the end 27 disengages again when the input shaft 24 takes the coupled position as shown in FIG. 3a. In the embodiment of FIG. 2, a further gap 45 is formed on the guide rail 41, so that the entrainer 34 of the input shaft 24 can couple with the actuating device 38. The arrangement is preferably such that the catch 40 on the actuating device 38 of the assigned holder 18 is aligned in parallel to the passage for the guide rail 41. Furthermore, the dihedron 34 is aligned lying in the plane of the guide rail 41, such that the dihedron 34 engages with the catch 40 on the actuating device 38 by coupling in the direction of the drive axis A when the tool holder 18 is swiveled in without a rotary motion of the input shaft 24. A rotary motion of the input shaft 24 then activates the fixing device 20 for releasing the tool holder 38.

Figure 4A:
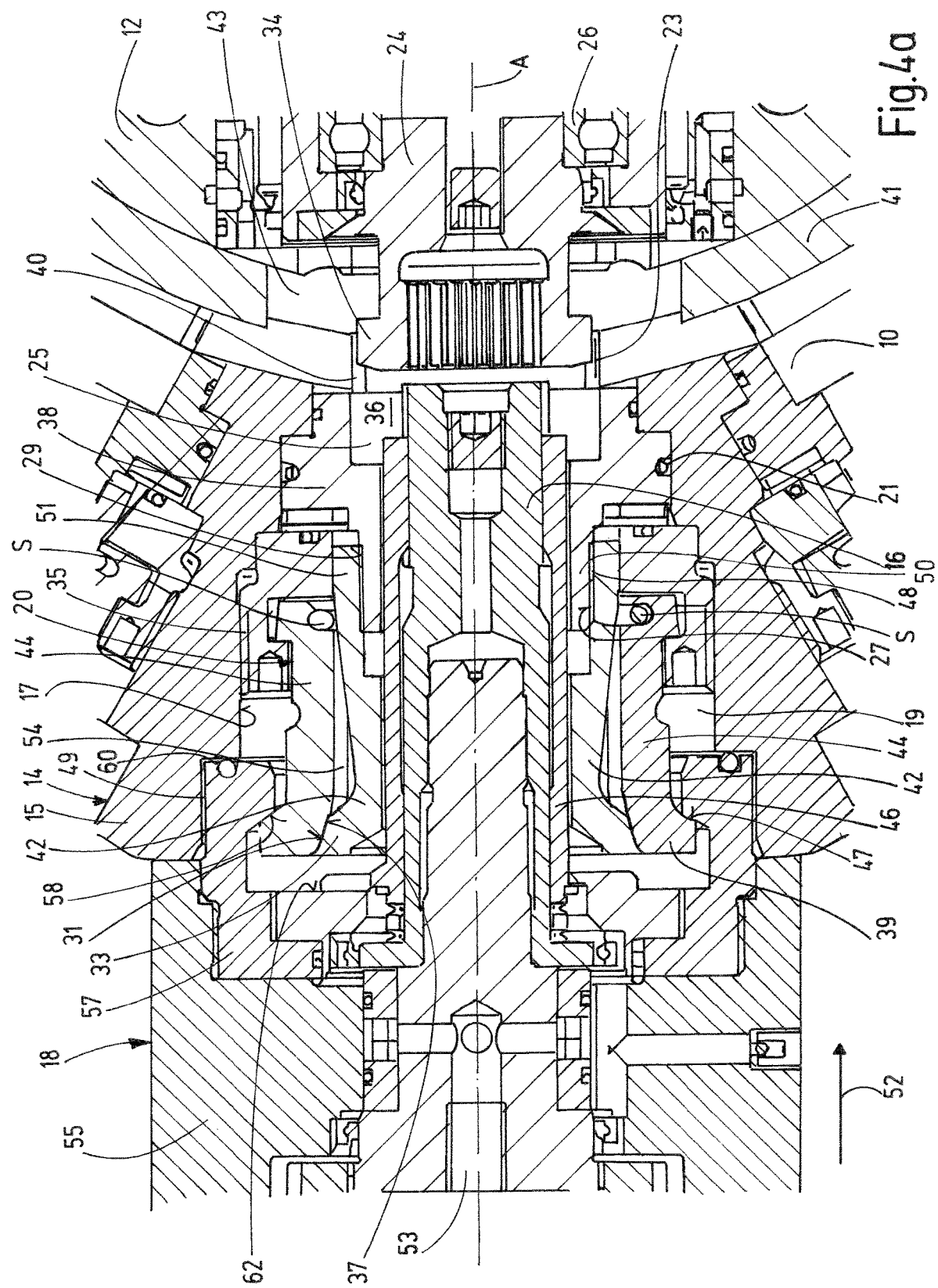
FIGS. 4a and 4b are enlarged longitudinal view of a subarea of FIG. 1 in section through the tool disk to illustrate how the pawl gear of the fixing device works in the latched and in the released position.
Figure 4B:
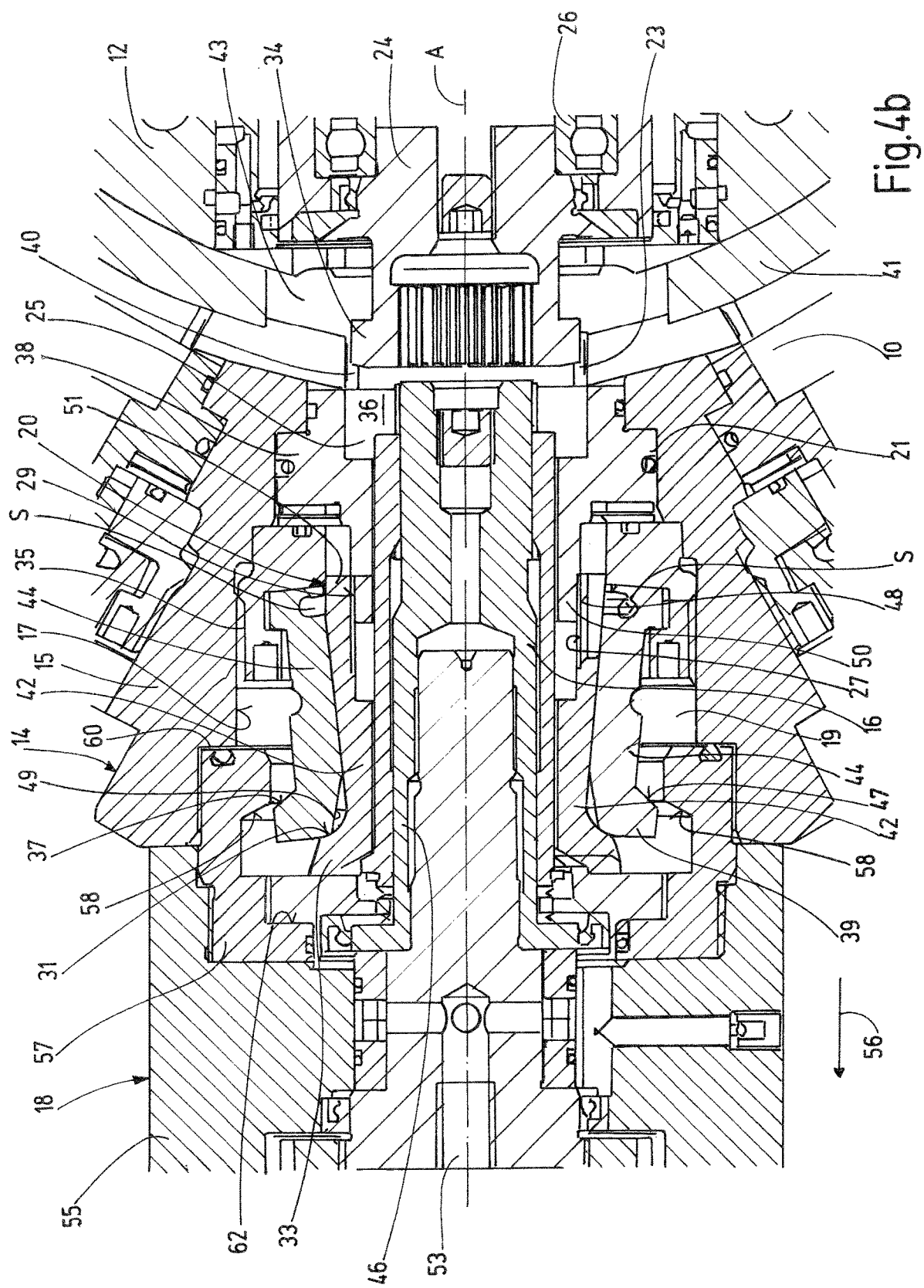

FIGS. 4a and 4b each show a longitudinal section through, in relation to the other figures, an enlarged sub area of the tool turret having a receptacle 14 and a tool holder 18. On the base body 12, shown in the figures on the right, of the tool turret the guide rail 41 runs or extends radially outside the circumference of the base body 12 and is interrupted by a gap 43 in the partial area shown. The input shaft 24 is supported pivotably about the drive axis A on the base body 12.

Furthermore, the input shaft 24 protrudes in the axial direction, parallel to the drive axis A, beyond the base body 12 and in so doing reaches through the gap 43 in the guide rail 41. At the front end, the input shaft 24 has the entrainer 34, which is formed as a dihedron and, in the sectional plane shown, protrudes on both sides in a radial direction beyond the adjoining main part of the input shaft 24. The gap 43 is formed larger than the axial extension of the coupling parts, in particular of the entrainer 34, at the front end of the input shaft 24. The input shaft 24 is rotationally drivable by the drive 22 (see FIG. 1) and is held in an axially displaceable manner along the drive axis A by the coupling device 26 described in detail in FIGS. 3a and 3b.

The receptacle 14, shown in FIGS. 4a and 4b in the center, is located on the tool disk 10 and has a main body 15 firmly connected to the tool disk 10. The main body 15 is arranged, in relation to the drive axis A, radially outside at the receptacle 14 and has a stepped section 17 on the inside. The section 17 delimits an installation space 19, in which the fixing device 20 is located. The main body 15, the section 17 and installation space 19 are formed rotationally symmetrical to the drive axis A. The fixing device 20 comprises an actuating device 38 and at least one pair of control pawls 42 and latching pawls 44.

The actuating device 38 is located in an area assigned to the input shaft 24, on the right in the figures, and is rotatably supported in a groove 21 running or extending radially inwards on the main body 15. At its end, facing the input shaft 24, an entrainment sleeve 23 of the actuating device 38 protrudes beyond the main body 15 of the receptacle 14. In the entrainment sleeve 23 the catch 40 is formed as a slot, which matches the entrainer 34 on the input shaft 24. At the opposite end, assigned to the pawls 42, 44, the actuating device 38 has an actuating sleeve 50. The actuating device 38, which is rotationally symmetrical to the drive axis A, extends in the axial direction across approximately ⅓ of the tool holder receptacle space 25 defined by the receptacle 14. In an area axially adjoining the entrainment sleeve 23, the actuating device 38 is tapered in the radial direction, and thus, defines an annular space 36 as a partial space of the tool holder receptacle space 25. The radial extension of the annular space 36 corresponds at least to the radial extension of the entrainer 34 on the input shaft 24.

The pawls 42, 44, each arranged in pairs, are located in an area, assigned to the tool holder 18, of the receptacle 14, in the figures on the left. The control pawls 42 are arranged radially inwards in relation to the latching pawls 44 and are an integral part of a control sleeve 51, i.e. instead of a large number of individual control pawls 42, these are realized combined in their function by the control sleeve 51 as a whole. The control sleeve 51 is located at the end assigned to the actuating device 38 and has an inside thread 27 there. The inside thread 27 engages with a corresponding outside thread 29 on the actuating sleeve 50 of the actuating device 38 via a threaded section 48. The respective control pawl 42 extends in the axial direction to the outer end, facing the tool holder 18 of the tool holder receptacle space 25. From the control sleeve 51, the outer contour of the control pawl 42 tapers in the axial direction up to a control surface 31, which is formed radially outwards on a widening 33 at the outer end of the control pawl 42.

The latching pawls 44 are each arranged pivotable about a swivel axis S on the main body 15 of the receptacle 14. The respective swivel axis S is provided in the area of an external second step of the stepped section 17 in the area where the control sleeve 51 is engaged with the actuating sleeve 50. From the inner end assigned to the swivel axis S, the inner contour of the latching pawl 44 runs or extends straight in the axial direction up to a further control surface 37, which is formed radially inwards on a further widening 39 at the outer end of the assigned latching pawl 44. Radially on the outside at the further widening 39 of the latching pawl 44, a contact surface 47 is formed, which is formed on the outer contour of the latching pawl 44 running or extending inclined and having a diameter that increases from the inside to the outside. The contact surface 47 is formed correspondingly to a fixing surface 58 on the tool holder 18. In addition, a seat 60, formed as an axial annular surface, is provided for the tool holder 18 on an outer first step 49 of the stepped section 17 of the main body 15.

As a central component, the tool holder 18 encompasses the tool spindle 16, which is arranged coaxially to the drive axis A. The tool spindle 16 is inserted into a receptacle sleeve 46 and together with it inserted into the tool holder receptacle space 25 of the receptacle 14. The tool spindle 16 has a tool receptacle space 53, which is only partially shown in the illustration in FIGS. 4a and 4b and is formed concentric to the drive axis A. The tool spindle 16 is rotatably supported in a base part 55 of the tool holder 18. The base part 55 is in contact with the outside of the main body 15 of the receptacle 14 and in the end area there has a recess having a stepped inner section. Into the recess, a fixing part 57 is inserted, which has a U-shaped section having a stepped outer contour. The fixing part 57 extends in the axial direction from the recess on the base part 55 of the tool holder 18 up to the seat 60 on the main body 15 of the receptacle 14. The fixing surface 58 is formed on the fixing part 57 opposite from a surface, which gets into contact with the seat 60. The fixing surface 58 is formed in an inclined manner to match the fixing surface 47 on the respective latching pawl 44.

FIG. 4a shows the latched position of the pawl gear formed by the control pawls 42 and the latching pawls 44. In the latched position, the holder 18 is connected to the tool disk 10. FIG. 4b shows the released position of the pawl gear. In the released position, the control pawls 42 and latching pawls 44 release the holder 18. To drive the actuating device 38 by the drive 22 (FIGS. 1 and 2), the input shaft 24 is displaced in the axial direction such that the entrainer 34 engages with the catch 40. If the input shaft 24 is driven in a rotatory manner, the actuating device 38 of the fixing device 20 is set into a rotating motion. Via the threaded section 48 between the actuating sleeve 50 and the control sleeve 51, the force from the actuating device 38 is transmitted to the respective control pawl 42, and the rotary motion of the actuating device 38 is converted into a translatory motion of the control pawl 42.

The internal thread 27 on the control sleeve 51 and the external thread 29 on the actuating sleeve 50 are formed such that the control pawls 42 are moved from the outside inwards, towards the input shaft 24, when a rotary motion is made, in the direction of view from the input shaft 24 to the actuating device 38, in clockwise direction. If the drive motion is counter-clockwise, the control pawls 42 are moved in the opposite direction from the inside to the outside.

In the latched position shown in FIG. 4a, the control pawls 42 and latching pawls 44, which are assigned pairwise to each other, viewed in the axial direction, are finishing flush with the outer end of the toolholder receptacle space 25. The two matching control surfaces 31, 37 are contacting each other, and the contact surface 47 of the latching pawl 44 contacts the fixing surface 58 on the fixing part 57. The pulling force, applied to the control pawl 42 by the actuating device 38, is transmitted via the surfaces 31, 37, 47, 58 contacting each other to the fixing part 57 and via this arrangement further on to the seat 60 on the main body 15 of the receptacle 14. In total there is a flow of force from the input shaft 24 via the actuating device 38, the pawls 42, 44 and the fixing part 57 of the tool holder 18 to the main body 15 of the receptacle 14. Because the main body 15 is firmly connected to the tool disk 10, the tool holder 18 is connected via the pawl gear, acting on the fixing part 57, in a latched position to the tool disk 10. The direction of the pulling force applied by the pawl gear is indicated by a first arrow 52.

To release the holder 18, the input shaft 24 is rotated in the opposite direction, and via the actuating sleeve 50, the control sleeve 51 is set in a translatory motion from the inside to the outside, away from the input shaft 24. In a sliding motion along the control surface 31, the respective latching pawl 44 drops into a receptacle space 54 between the control pawl 42 and the latching pawl 44. The latching pawl 44 is swiveled about the swivel axis S until the inner contour of the latching pawl 44 is in contact with the outer contour of the assigned control pawl 42. This swivel motion causes the contact surface 47 of the latching pawl 44 to disengage from the fixing surface 58 on the fixing part 57. In this way, the tool holder 18 is released and can be removed from the seat 60 on the holder 14. FIG. 4b illustrates that the latching pawl 44 in the released position is swiveled in the direction of the control pawl 42 at least so far that the fixing part 57 of the tool holder 18 can be removed from the holder 14 past the further widening 39 of the latching pawl 44 in the axial direction without obstruction. The removal of the tool holder 18 from the receptacle 14 is facilitated in that the force applied to the control pawl 42 by the actuating device 38 is transmitted to an inner surface 62 of the fixing part 57. With a release force preset in this way, the control pawls 42, which are moved in the direction of the holder 18, lift the holder 18 from its seat 60 on the tool disk 10. By a second arrow 56 the direction of the force effect is illustrated.

As soon as a holder 18, to be removed from the tool disk 10, is released by the fixing device 20, a handling system such as a robot can grip the holder 18, preferably at gripper grooves, and remove it from the tool disk 10. The robot (not shown in the figures) then places the holder 18 in a magazine (not shown in the figures), picks up there the holder 18 to be inserted and positions it in the change position on the tool disk 10. As soon as the newly inserted holder 18 has been fixed on the tool disk 10 by the fixing device 20, the robot releases the holder 18. If this tool holder change has been performed in a separate change position, the newly inserted holder 18 is swiveled into the working position if required. As a rule, the tool turret is formed in such a way that a working tool mounted in the holder 18 can only in the working position be driven via the input shaft 24. A working tool is preferably removed, inserted or replaced on a holder 18 removed from the tool disk 10. However, a working tool can also be fixed to or removed from the assigned holder 18 in the change position before or after a tool holder change. All in all, a highly flexible tool holder change on a tool turret is provided for the most varied requirements.

While various embodiments have been chosen to illustrate the invention, it will be understood by those skilled in the art that various changes and modifications can be made therein without departing from the scope of the invention as defined in the claims.

The invention claimed is:

1. A tool turret for use within a machine tool, the tool turret comprising:
   a pivotable tool disk;
   a plurality of receptacles on an outer circumference of the tool disk; and
   a plurality of holders, each of the plurality of holders detachably connected in one of the plurality of receptacles and provided with a respective working tool,
   a respective holder of the plurality of holders with the respective working tool being changeably attached to the tool disk by a fixer,
   each of the plurality of holders being capable of being swiveled into a working position at which the respective working tool is able to be driven by a drive that is coupled to an output shaft of the respective holder by a coupler, and
   the fixer being actuatable by the drive when the drive is uncoupled from the respective working tool and the respective working tool of the respective holder has stopped moving, the fixer including a pawl gear having control pawl and latching pawl arranged in a pair, the control pawl and the latching pawl assigned to each other and controlled by an actuator such that the control pawl and the latching pawl attach the respective holder to the tool disk in a latched position of the control pawl and the latching pawl and release the respective holder in a detached position of the control pawl and the latching pawl.

2. The tool turret according to claim 1 wherein the fixer is actuatable by the drive in at least one of the working position or a change position that is different from the working position on the tool disk.

3. The tool turret according to claim 2 wherein the working position and the change position are on opposite sides of the tool disk.

4. The tool turret according to claim 1 wherein a rotary motion of the actuator by the drive is converted into a translatory motion for the control pawl, the translatory motion causing the latching pawl in a first direction to move into a receptacle space of the control pawl in the detached position and in an opposing second direction causing displacement of the latching pawl from the receptacle space in the direction of the latched position.

5. The tool turret according to claim 4 wherein while bringing the latching pawl into the detached position, the control pawl is moved in a direction of the respective holder and lifts the respective holder from a seat thereof on the tool disk with a pre-settable release force.

6. The tool turret according to claim 1 wherein the latching pawl is supported pivotably about a swivel axis; and
the control pawl is an integral component of a control sleeve that is movably guided along a receptacle sleeve, the receptacle sleeve encompassing at least a part of the output shaft of the respective working tool.

7. The tool turret according to claim 6 wherein the actuator in a direction of one free end thereof engages with the control sleeve via a threaded section and in a direction of another free end thereof has a catch for engagement with an entrainer of an input shaft of the drive.

8. The tool turret according to claim 7 wherein the input shaft of the drive is guided axially displaceable in the tool disk for driving the respective working tool by the coupler and for controlling the fixer in the working position;
in a coupling position of the input shaft, while the entrainer is reaching through the catch, the respective working tool of the respective holder is drivable when the fixer is inactive by being decoupled from the drive; and
in a retracted position of the input shaft and when the drive is decoupled from the respective working tool, the entrainer arranged on the input shaft contacts with the catch while activating the fixer.

9. The tool turret according to claim 7 wherein for controlling the fixer in a change position that is different from the working position on the tool disk, the input shaft has the entrainer at a side of the input shaft opposite from the coupler.

10. The tool turret according to claim 1 wherein the respective holder is a spindle head.

* * * * *